US006609384B2

(12) United States Patent
Satoh

(10) Patent No.: US 6,609,384 B2
(45) Date of Patent: Aug. 26, 2003

(54) DYNAMIC TYPE ICE COLD STORAGE METHOD

(75) Inventor: Isao Satoh, Tokyo (JP)

(73) Assignee: Tokyo Institute of Technology (JP)

( * ) Notice: Subject to any disclaimer, the term of this patent is extended or adjusted under 35 U.S.C. 154(b) by 0 days.

(21) Appl. No.: 10/298,709

(22) Filed: Nov. 18, 2002

(65) Prior Publication Data

US 2003/0061821 A1 Apr. 3, 2003

Related U.S. Application Data

(62) Division of application No. 10/033,871, filed on Dec. 20, 2001.

(30) Foreign Application Priority Data

Mar. 12, 2001 (JP) ........................................ 2001-069081

(51) Int. Cl.$^7$ ................................................ F25C 1/18
(52) U.S. Cl. ................................ 62/68; 62/135; 62/342; 62/544
(58) Field of Search ............................... 62/66, 68, 74, 62/135, 342, 532, 544

(56) References Cited

U.S. PATENT DOCUMENTS

| 3,328,972 A | * | 7/1967 | Svanoe ........................ 62/123 |
| 3,347,058 A | * | 10/1967 | Svanoe ........................ 62/541 |
| 4,480,445 A | * | 11/1984 | Goldstein ..................... 62/434 |
| 4,551,159 A | * | 11/1985 | Goldstein ..................... 62/541 |
| 4,554,797 A | * | 11/1985 | Goldstein ..................... 62/434 |
| 4,796,441 A | * | 1/1989 | Goldstein ..................... 62/354 |
| 4,912,935 A | * | 4/1990 | Goldstein ..................... 62/123 |
| 5,035,733 A | * | 7/1991 | Goldstein ..................... 62/541 |
| 5,037,463 A | * | 8/1991 | Engdahl et al. ............... 62/532 |
| 5,139,549 A | * | 8/1992 | Knodel et al. ................ 62/532 |
| 5,140,275 A | * | 8/1992 | Schoerner et al. ........... 324/693 |
| 5,363,660 A | * | 11/1994 | Li et al. ........................ 62/71 |
| 5,953,924 A | * | 9/1999 | Li et al. ........................ 62/71 |

FOREIGN PATENT DOCUMENTS

| EP | 000436758 A1 | * | 7/1991 |
| JP | 406094266 A | * | 4/1994 |
| JP | 410332178 A | * | 12/1998 |

* cited by examiner

Primary Examiner—William E. Tapolcai
Assistant Examiner—Mohammad M. Ali
(74) Attorney, Agent, or Firm—Adams & Wilks

(57) ABSTRACT

It is intended to provide a dynamic type ice cold storage method and system capable of efficiently suppressing, by an appropriate replenishment of water, an increase in concentration of an aqueous solution with the progress of freezing of the aqueous solution, thereby preventing a lowering in the coefficient of performance of a refrigerator, and hence diminishing power required for the formation of ice crystals. The temperature of an aqueous solution contained in a freezer which includes a heat exchanger for cooling is measured with a thermometer, and as the liquid temperature drops with the progress of freezing, melted water is replenished into the freezer from a melted water tank by means of a pump to keep almost constant the temperature of freezing performed by the heat exchanger for cooling.

2 Claims, 6 Drawing Sheets

DYNAMIC TYPE ICE COLD STORAGE METHOD

This is a division of application Ser. No. 10/033,871, filed Dec. 20, 2001.

BACKGROUND OF THE INVENTION

1. Field of the Invention

The present invention relates to a method and system for dynamic type ice cold storage of ice crystals as an ice slurry which ice crystals are formed by freezing of an aqueous solution.

2. Description of the Prior Art

As means for leveling, or eliminating, a difference in the demand for electric power between day and night in the summer season, an ice cold storage means which utilizes a surplus electric power in the night time is considered to be effective. In this connection, a dynamic type ice cold storage system capable of freezing an aqueous solution and transporting the resulting ice crystals as an ice slurry up to a place requiring cold is superior in cooling performance during the formation of ice crystals and also in point of reduction in size of the system, but a drawback has been pointed out such that the freezing temperature drops gradually due to an increase in concentration of an aqueous solution with the progress of freezing of the aqueous solution and that therefore the coefficient of performance of the refrigerator used becomes lower and the electric power required for the formation of ice crystals increases.

SUMMARY OF THE INVENTION

Accordingly, it is an object of the present invention to provide a dynamic type ice cold storage method and system capable of efficiently suppressing, by an appropriate replenishment of water, an increase in concentration of an aqueous solution with the progress of freezing of the aqueous solution, thereby preventing a lowering in the coefficient of performance of a refrigerator, and hence capable of decreasing the amount of electric power required for the formation of ice crystals.

For achieving the above-mentioned object, in the first aspect of the present invention, there is provided a dynamic type ice cold storage method wherein when an aqueous solution is charged into a freezer which includes a heat exchanger for cooling, allowing an ice slurry containing ice crystals to be formed within the freezer, water is replenished into the freezer in a successive manner in response to a drop in liquid temperature in the freezer so as to keep the freezing temperature in the freezer almost constant.

In the second aspect of the present invention, there is provided, in combination with the above first aspect, a dynamic type ice cold storage method wherein melted water obtained by melting the ice crystals in the freezer at the time of a previous recovery of cold is used as the water which is replenished in a successive manner into the freezer.

Thus, if melted water obtained by melting the ice crystals in the freezer at the time of a previous recovery of cold and which has been stored is utilized, the melted water can be utilized appropriately and repeatedly because it is substantially in the state of pure water containing little solute.

In the third aspect of the present invention, there is provided a dynamic type ice cold storage system comprising a heat exchanger for cooling capable of serving also as a heat exchanger for the recovery of cold, a freezer including the heat exchanger for cooling and capable of serving also as a melter, a thermometer for measuring the temperature of liquid contained in the freezer, an agitator provided in a bottom of the freezer to agitate the liquid contained in the freezer, a mesh stretched horizontally within the freezer at a position somewhat higher than the agitator, an aqueous solution tank connected to the bottom of the freezer through a pipe with valve and also through an aqueous solution pump, and a melted water tank connected to the bottom of the freezer through a pipe with valve and also through a melted water pump.

In the dynamic type ice cold storage system according to the present invention just referred to above, at the time of ice cold storage, first an aqueous solution is fed into the freezer from the aqueous solution tank by means of the aqueous solution pump and an ice slurry containing ice crystals is formed by both freezing action of the heat exchanger for cooling and agitating function of the agitator. In this case, in accordance with a measured value of liquid temperature in the freezer obtained by the thermometer and for the purpose of preventing a drop of the freezing temperature, melting water stored at the time of a previous recovery of cold is replenished into the freezer from the melting water tank by means of the melting water pump and the concentration of the aqueous solution can thereby be maintained in a standard condition, so that the formation of the aforesaid ice slurry can be done efficiently.

Moreover, in the recovery of cold, the freezer is used as a melter and the heat exchanger for cooling is used as a heat exchanger for the recovery of cold. In this case, the aqueous solution contained in the ice slurry is filtered beforehand through the mesh and is stored in the aqueous solution tank, thus permitting repeated use of the above aqueous solution and melted water.

In the fourth aspect of the present invention, there is provided a dynamic type ice cold storage system comprising a freezer including a heat exchanger for cooling, an agitator provided in a bottom of the freezer, a thermometer for measuring the temperature of liquid contained in the freezer, a melter connected to the freezer through a pipe with pump and including a heat exchanger for the recovery of cold, and a mesh stretched horizontally in a bottom of the melter, wherein an aqueous solution tank is connected to the freezer through a pipe with valve and also through an aqueous solution pump, a melted water tank is connected to the freezer through a pipe with valve and also through a melted water pump, and there are further provided a pipe with valve for connecting the bottom of the melter to the aqueous solution tank and a pipe with valve for connecting the bottom of the melter to the melted water tank.

Also in this construction wherein the freezer and the melter are provided separately and are connected with each other through a pipe with valve in the dynamic type ice cold storage system, as is the case with the previous construction wherein the freezer also serves as a melter, at the time of storing ice cold an aqueous solution is fed into the freezer from the aqueous solution tank through the aqueous solution pump and an ice slurry containing ice crystals is produced within the freezer by both freezing action of the heat exchanger for cooling and agitating action of the agitator. In this case, in accordance with a measured value of liquid temperature in the freezer detected by the thermometer and for preventing a drop of the freezing temperature, melted water stored at the time of a previous recovery of cold can be replenished into the freezer from the melted water tank by means of the melted water pump, so that the formation of the aforesaid ice slurry can be done efficiently.

In the recovery of cold, there is used the above heat exchanger for the recovery of cold included in the melter. In this case, the aqueous solution contained in the ice slurry is filtered beforehand through the mesh and is stored in the aqueous solution tank, while the remaining ice crystals are melted by the heat exchanger for the recovery of cold and the resulting melted water is stored in the melted water tank. Thus, the aqueous solution and the melted water can be used repeatedly.

Besides, since the freezer and the melter are connected together through a pipe with pump, even if the place requiring cold is remote from the freezer, it is possible to feed the ice slurry through the said pipe with pump if the pipe with pump is covered with a sufficient cold retaining layer.

In the fifth aspect of the present invention, there is provided, in combination with the above third or fourth aspect, a dynamic type ice cold storage system further including a control system which, in accordance with a detection signal provided from the thermometer, automatically controls the feed of water into the freezer which feed of water is conducted by the melted water pump, for adjusting the concentration of the aqueous solution contained in the freezer.

According to this construction, since the concentration of the aqueous solution in the freezer is thus adjusted in accordance with a detection signal provided from the thermometer which detects the temperature of liquid contained in the freezer, if the feed of water into the freezer by the melted water pump is done automatically by the control system, the operation and management of the dynamic type ice cold storage system are effected accurately in a high efficiency.

Generally, an increase in concentration of an aqueous solution caused by freezing and the resulting decrease of the freezing temperature are widely recognized as a factor of synthetic performance deterioration peculiar to a dynamic type ice cold storage system which uses an aqueous solution. As means for avoiding such an inconvenience, there is adopted a negative and symptomatic means such as (1) lowering an initial concentration of the aqueous solution used or (2) keeping low the amount of ice crystals formed. However, the former involves the problem that the production of an ice slurry (a mixture of solution and ice crystals: ice crystals having fluidity) becomes difficult, thus requiring the development of a new technique for the formation of ice crystals and energy. As to the latter means, it causes a decrease in the proportion of ice crystals contained in a cold storage vessel, i.e., a decrease in the amount of cold stored, thus involving the likelihood that the merits of the dynamic type ice cold storage system may be cancelled.

At present, there has been established no concrete technique for solving the problem induced by an increase in concentration of an aqueous solution with freezing of the solution. For this reason the dynamic type ice cold storage system has not become so popular yet. As noted above, the deterioration in performance of the dynamic type ice cold storage system which utilizes freezing of an aqueous solution is based on a solute concentration effect resulting from freezing of the aqueous solution.

The present invention utilizes the above phenomenon conversely to suppress the deterioration in performance of the dynamic type ice cold storage system. More specifically, with freezing of an aqueous solution, the concentration of the aqueous solution increases due to a solute concentration effect, while ice crystals containing little solute are produced. If the ice crystals are melted at the time of the recovery of cold, there is obtained a substantially pure water, so if this pure water is stored and the aqueous solution is frozen while adding the pure water into the aqueous solution at the time of cold storage, it is possible to keep the concentration of the aqueous solution constant. This is the principle of the present invention.

A major feature of the present invention resides in that, by utilizing a solute concentration effect induced naturally at the time of freezing an aqueous solution, the deterioration in performance of the dynamic type ice cold storage system caused by a drop of the freezing temperature can be suppressed without the use of any additional device or energy.

DETAILED DESCRIPTION OF PREFERRED EMBODIMENTS

Figure 1:
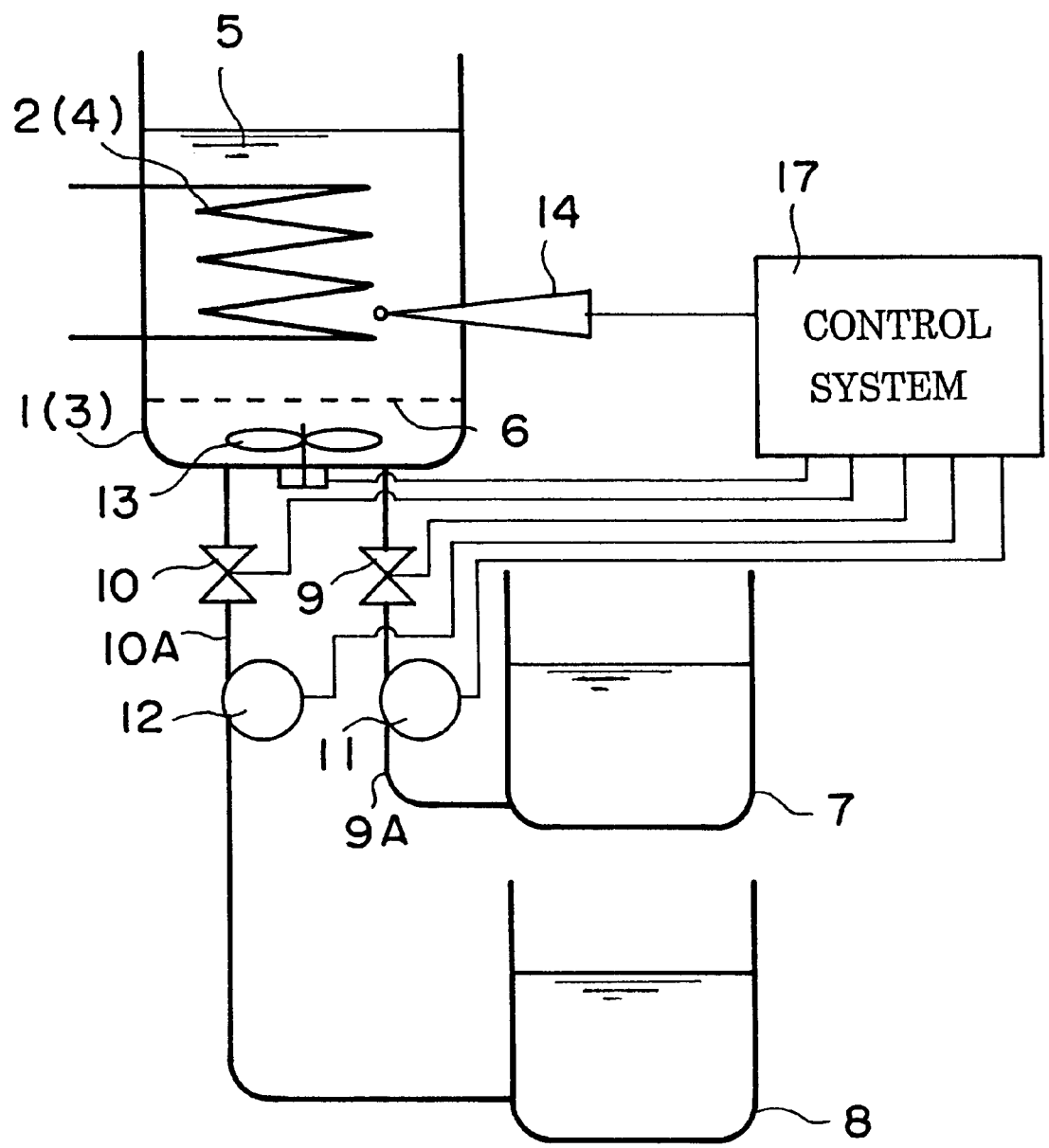
FIG. 1 is an explanatory diagram showing schematically a dynamic type ice cold storage system according to the first embodiment of the present invention.
Figure 2:
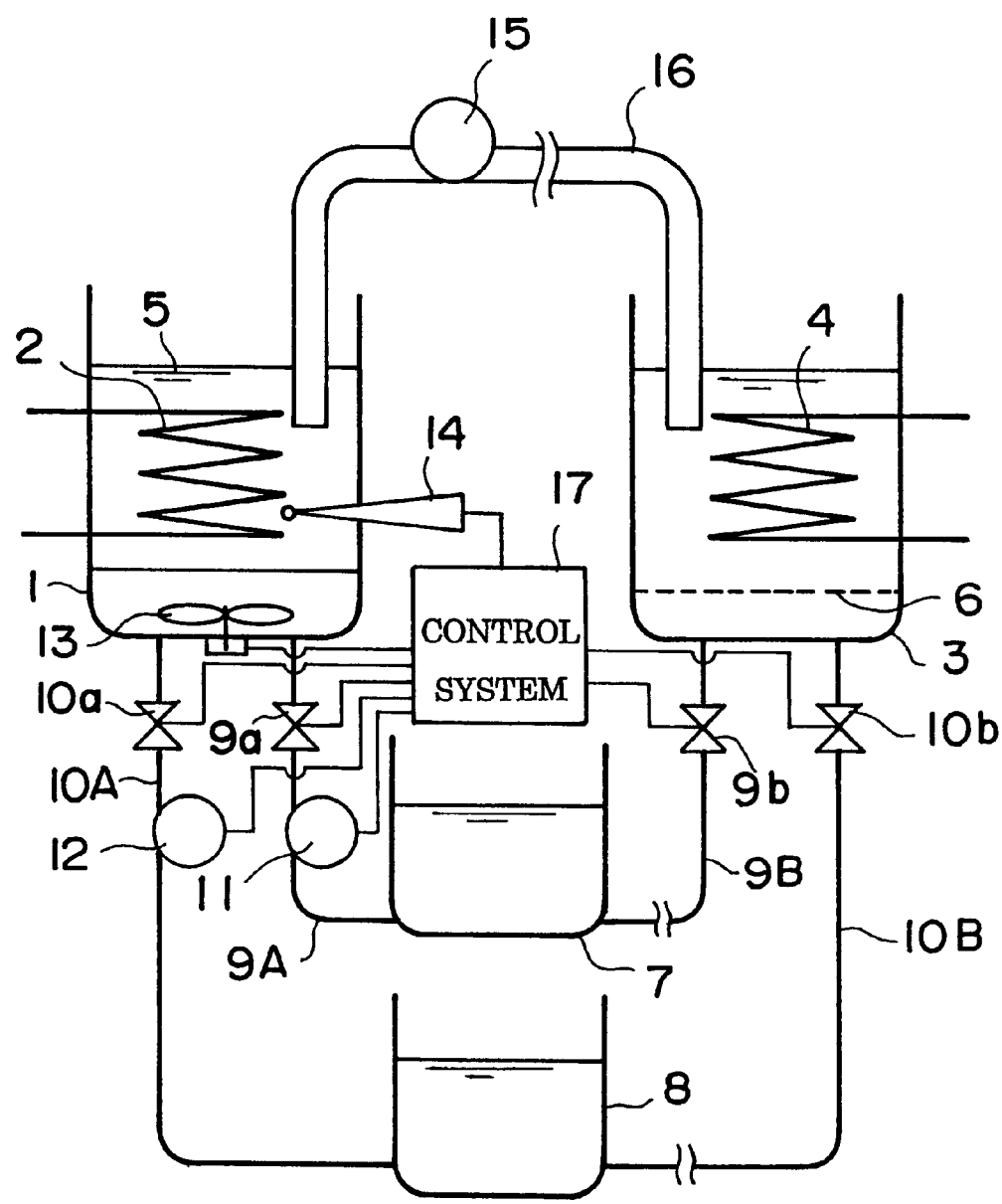
FIG. 2 is an explanatory diagram showing schematically a dynamic type ice cold storage system according to the second embodiment of the present invention.
Figure 3:
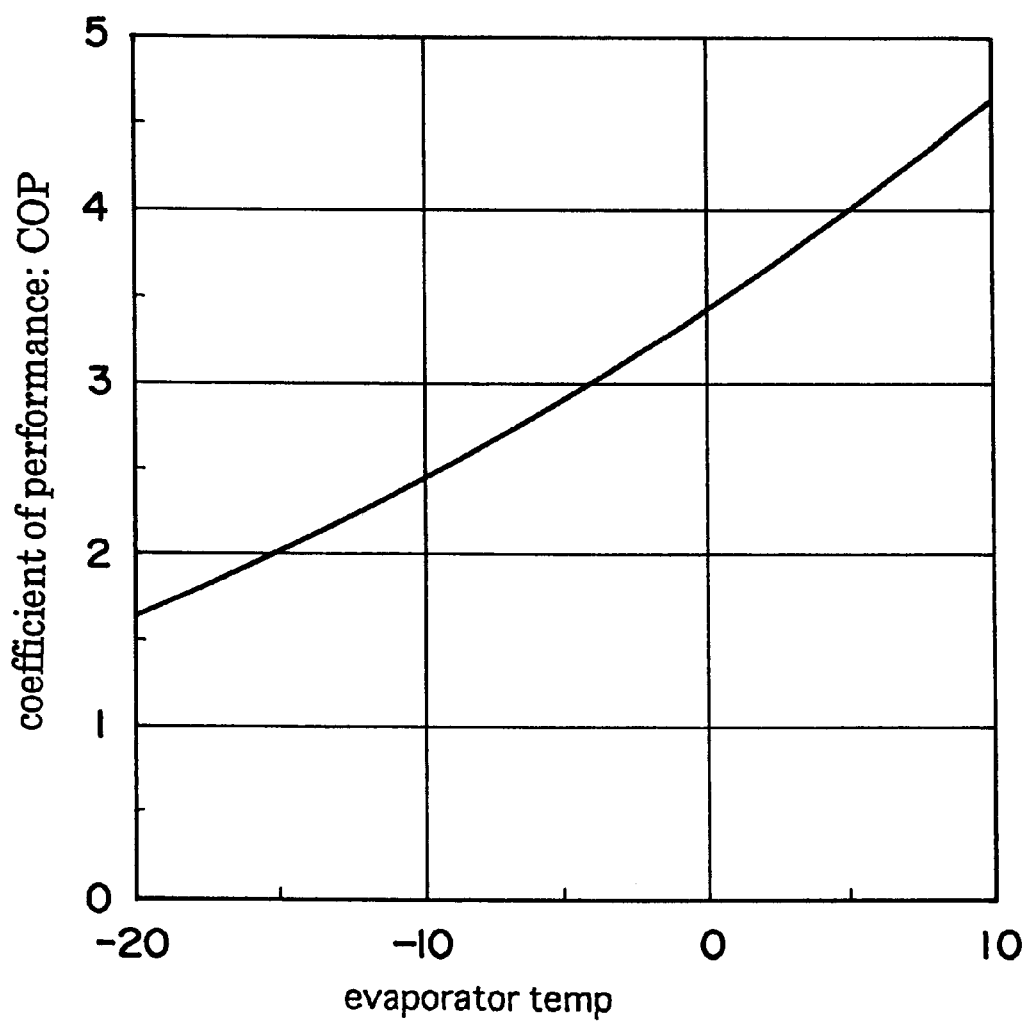
FIG. 3 is a graph showing a coefficient of performance of a refrigerator used in comparing the performance of a method and system according to the present invention with that of a system based on the prior art.
Figure 4:
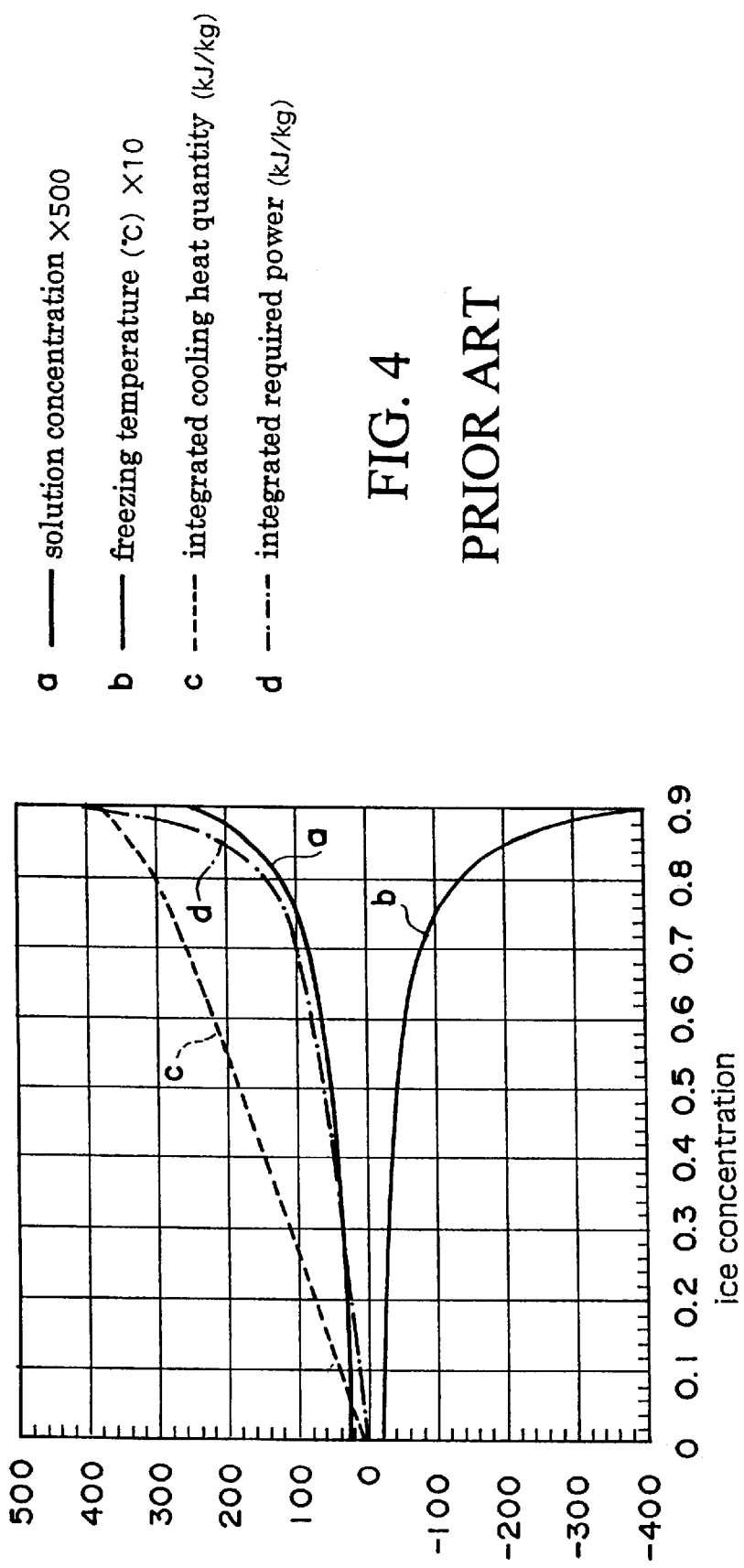
FIG. 4 is a graph showing characteristics of an ice cold storage system according to the prior art.
Figure 5:
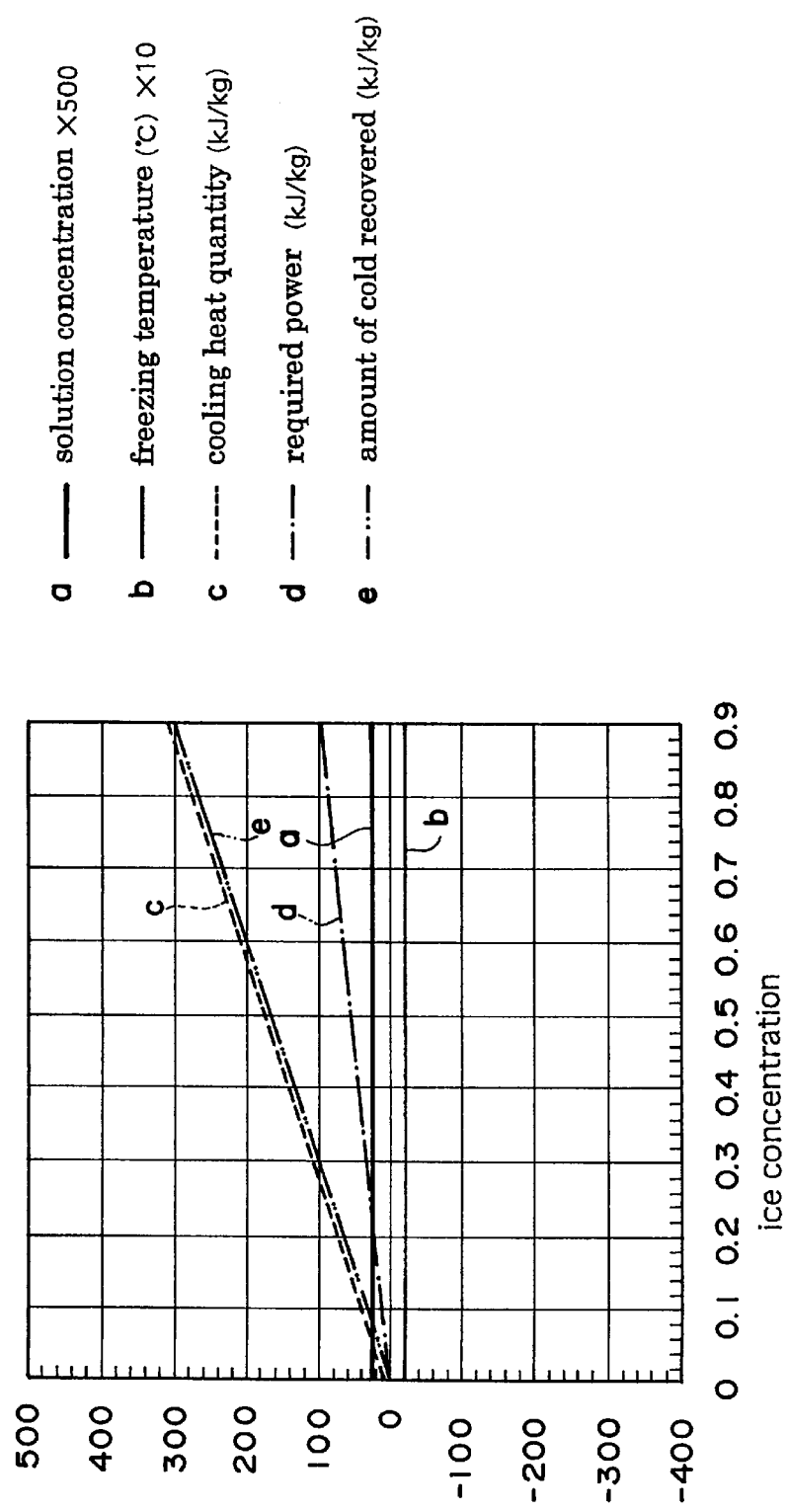
FIG. 5 is a graph showing characteristics of a dynamic type ice cold storage system according to the present invention.
Figure 6:
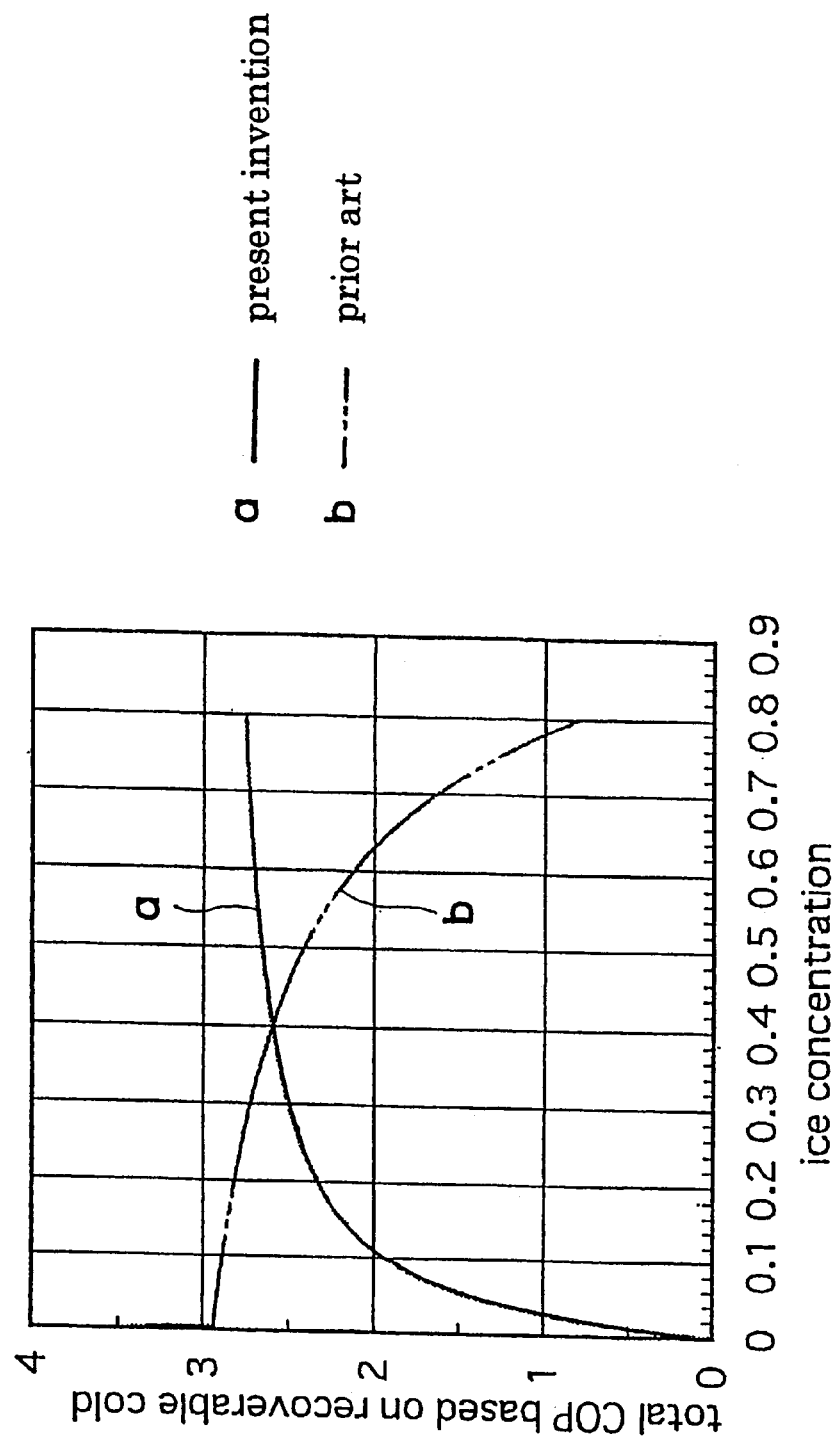
FIG. 6 is a graph showing a comparison of total coefficient of performance between the present invention and the prior art.

Dynamic type ice cold storage method and system embodying the present invention will be described hereinunder with reference to the accompanying drawings, in which FIG. 1 is an explanatory diagram schematically showing a system according to the first embodiment of the present invention, FIG. 2 is an explanatory diagram showing schematically a system according to the second embodiment of the present invention, FIG. 3 is a graph showing a coefficient of performance of a refrigerator obtained by using a method and system according to the present invention, FIG. 4 is a graph showing characteristics of an ice cold storage system according to the prior art, FIG. 5 is a graph showing characteristics of a dynamic type ice cold storage system according to the present invention, and FIG. 6 is a graph comparing a total coefficient of performance between the present invention and the prior art.

Reference will now be made to the first embodiment of the present invention. As shown in FIG. 1, a heat exchanger 2 for cooling, which can also serve as a heat exchanger 4 for the recovery of cold, is provided so as to be included within a freezer 1 which can serve also as a melter 3. A thermometer 14 is provided for measuring the temperature of an aqueous solution 5 contained in the freezer 1, the aqueous solution 5 being of an ordinary type of salt or ethylene glycol. In a bottom of the freezer 1 is provided an agitator 13 for agitating the liquid contained in the freezer 1, and a mesh (e.g., wire net) 6 is stretched horizontally in the interior of the freezer 1 at a position somewhat higher than the agitator 13.

An aqueous solution tank 7 is connected to the bottom of the freezer 1 through a pipe 9A with valve 9 and further through an aqueous solution pump 11, and also connected to the bottom of the freezer 1 is a melted water tank 8 through a pipe 10A with valve 10 and further through a melted water pump 12.

Further, provided is a control system 17 which automatically controls the feed of water into the freezer 1 by the melted water pump 12 so that the concentration of the aqueous solution 5 in the interior of the freezer 1 can be adjusted in accordance with a detection signal provided from the thermometer 14.

According to the method of the present invention, when the aqueous solution 5 is charged into the freezer 1 which includes the heat exchanger 2 for cooling and an ice slurry containing ice crystals is produced within the freezer 1 by the heat exchanger 2, water is replenished into the freezer 1 in accordance with a drop of the freezing temperature so that the freezing temperature in the freezer 1 can be kept almost constant. As the water, melted water obtained by melting ice crystals in the freezer 1 at the time of a previous recovery of cold is replenished from the melted water tank 8 by means of the melted water pump 12.

In the system constructed as above, all of the freezer 1, the aqueous water tank 7, melted water tank 8 and pipes are covered on their outer surfaces with a heat insulating layer.

In the dynamic type ice cold storage method and system of the above embodiment, when ice cold is to be stored, the aqueous solution 5 in the freezer 1 is frozen by the heat exchanger 2 for cooling to produce an ice slurry which contains ice crystals, and at the same time water is replenished into the freezer 1 in a successive manner, so that it becomes possible to prevent an increase in concentration of the aqueous solution 5 in the freezer 1 and keep the freezing temperature in the freezer 1 almost constant, whereby a lowering in the coefficient of performance of the refrigerator is suppressed and hence the power required for the formation of ice crystals is decreased.

Moreover, as noted earlier, melted water of ice crystals in the freezer obtained at the time of a previous recovery of cold and stored in the melted water tank 8 is utilized as the water to be replenished into the freezer 1 during ice cold storage, which melted water is substantially in the state of pure water containing little solute. Therefore, the water can be utilized appropriately and repeatedly.

At the time of ice cold storage, first an aqueous solution is fed into the freezer 1 from the aqueous solution tank 7 by means of the aqueous solution pump 11 and an ice slurry containing ice crystals is produced within the freezer 1 under both freezing action of the heat exchanger 2 for cooling and agitating action of the agitator 13. In this case, in accordance with a measured value of temperature of the aqueous solution 5 in the freezer 1 obtained by the thermometer 14, the melted water stored in the previous recovery of cold is replenished into the freezer 1 from the melted water tank 8 by means of the melted water pump 12 so as to prevent a drop of the freezing temperature, whereby the concentration of the aqueous solution 5 can be maintained in a normal condition, thus permitting an efficient production of the ice slurry.

When recovering cold, the freezer 1 is used as the melter 3 and the heat exchanger 2 for cooling is used as the heat exchanger 4 for the recovery of cold. In this case, the aqueous solution contained in the ice slurry is filtered beforehand through the mesh 6 and is stored in the aqueous solution tank 7, while the remaining ice crystals are melted by the heat exchanger 4 for the recovery of cold and the resulting melted water is stored in the melted water tank 8 through the pipe 10A with valve 10 and further through the melted water pump 12. Therefore, the aqueous solution and the melted water can be used repeatedly.

Further, for automatically adjusting the concentration of the aqueous solution 5 in the freezer 1 in accordance with a detection signal provided from the thermometer 14 which detects the liquid temperature in the freezer 1, the feed of water into the freezer 1 by the melted water pump 12 is performed automatically by the control system 17. Consequently, the operation and management of this dynamic type ice cold storage system are performed efficiently and accurately.

A description will now be given of a dynamic type ice cold storage system according to the second embodiment of the present invention. In this second embodiment, as shown in FIG. 2, a freezer 1 which includes a heat exchanger 2 for cooling and a melter 3 which includes a heat exchanger 4 for the recovery of cold are provided separately from each other and are connected together through a pipe 16 with pump 15. A thermometer 14 for measuring the temperature of an aqueous solution 5 contained in the freezer 1 is provided and an agitator 13 for agitating the liquid in the interior of the freezer 1 is provided in a bottom of the freezer 1.

To the bottom of the freezer 1 is connected an aqueous solution tank 7 through a pipe 9A with valve 9a and further through an aqueous solution pump 11 and is also connected a melted water tank 8 through a pipe 10A with valve 10a and further through a melted water pump 12.

In the interior of the melter 3 is provided the heat exchanger 4 for the recovery of cold and in a bottom of the melter 3 is stretched a mesh 6 horizontally.

The bottom of the melter 3 is connected to the aqueous solution tank 7 through a pipe 9B with valve 9b and is also connected to the melted water tank 8 through a pipe 10B with valve 10b.

Further, a control system 17 is provided for automatically adjusting the feed of water into the freezer 1 by the melted water pump 12 so that the concentration of the aqueous solution (an aqueous solution of an ordinary type of salt or ethylene glycol) contained in the interior of the freezer 1 can be adjusted in accordance with a detection signal provided from the thermometer 14.

Also in this second embodiment, when an aqueous solution is charged into the freezer 1 which includes the heat exchanger 2 for cooling and an ice slurry containing ice crystals is allowed to be formed in the freezer 1 by the heat exchanger 2 for cooling, water is replenished into the freezer 1 in response to a drop of the freezing temperature so that the freezing temperature in the freezer 1 can be maintained almost constant. As the water, melted water obtained by melting ice crystals in the freezer 1 at the time of a previous recovery of cold is replenished from the melted water tank 8 by means of the melted water pump 12.

Also in the system of this embodiment, all of the freezer 1, the melter 3, the aqueous solution tank 7, melted water tank 8 and pipes are covered on their outer surfaces with a heat insulating layer.

In the dynamic type ice cold storage method and system according to the second embodiment, the freezer 1 and the melter 3 are provided separately from each other and are connected together through the pipe 16 with pump 15. Also in this case, as is the case with the above first embodiment, at the time of ice cold storage first an aqueous solution is fed into the freezer 1 from the aqueous solution tank 8 by the aqueous solution pump 12 and an ice slurry containing ice crystals is produced within the freezer 1 under both freezing action of the heat exchanger 2 for cooling and agitating action of the agitator 13. In this case, for preventing a drop of the freezing temperature, melted water stored at the time of a previous recovery of cold can be replenished into the freezer 1 from the melted water tank 8 by the melted water pump 12 in accordance with a measured value of temperature in the freezer 1 obtained by the thermometer 14, so that the formation of the ice slurry is carried out efficiently.

For the recovery of cold there is used the heat exchanger 4 for the recovery of cold disposed within the melter 3, but in this case the aqueous solution contained in the ice slurry is filtered beforehand through the mesh 6 and is stored in the aqueous solution tank 8, while the remaining ice crystals are melted by the heat exchanger 4 for the recovery of cold and the resulting melted water is stored in the melted water tank 8. Thus, the above aqueous solution and melted water can be used repeatedly.

Since the freezer 1 and the melter 3 are connected together through the pipe 16 with valve 15, even if the place requiring cold is remote from the freezer 1, the feed of an ice slurry through the pipe 16 with pump 15 can be effected by covering the outer periphery of the pipe 16 with a sufficient cold retaining layer.

Further, for adjusting the concentration of the aqueous solution in the freezer 1 in accordance with a detection signal provided from the thermometer 14 which detects the temperature of liquid contained in the freezer 1, the feed of water into the freezer 1 by the melted water pump 12 is performed automatically by the control system 17. Consequently, the operation and management of this dynamic type ice cold storage system are effected efficiently and accurately.

Next, a comparison is here made between a dynamic type ice cold storage system based on the prior art and an ice cold storage system according to the present invention, using an actual relation (FIG. 3) between refrigerator efficiency (coefficient of performance: COP) and evaporator temperature (cooling temperature). In this comparison, the amount of cold stored in the system, power required for the refrigerator, changes in concentration of the solution, and changes of the freezing temperature were predicted, the results of which are as shown in FIGS. 4 and 5.

As is seen from FIGS. 4 and 5, in the dynamic type ice cold storage system based on the prior art (FIG. 4), the solution concentration increases with an increase in the amount of cold stored c, that is, with an increase in concentration of ice crystals contained in the solution, and the resulting drop of the freezing temperature b causes a lowering in efficiency of the refrigerator, with a consequent extreme increase of the power required d for the refrigerator. On the other hand, in the ice cold storage system according to the present invention (FIG. 5), since the solution concentration a and the freezing temperature b are kept constant, there is no extreme increase in the power required d for the refrigerator and the storage of cold can be done by applying to the refrigerator a power nearly proportional to the amount of cold stored c. In the ice cold storage system according to the present invention, however, the cold which the aqueous solution possesses is dissipated at the time of recovery of cold, so the amount of cold recovered e becomes a little smaller than the amount of cold stored c. But the difference between the two is very small, as shown in FIG. 5, causing no problem in practical use.

For directly comparing the performance as the ice cold storage system, the amount of cold capable of being recovered after the storage of cold in the ice cold storage system according to the prior art and that in the ice cold storage system according to the present invention were each divided by the refrigerator driving power required to obtain a total coefficient of performance, which was then plotted relative to the amount of cold stored (ice crystals concentration in the solution). The results are as shown graphically in FIG. 6. As shown in the graph of FIG. 6, the ice cold storage system according to the present invention is inferior in performance to the conventional system due to the influence of the foregoing cold loss while the amount of cold stored per unit mass of solution is small, but surpasses the prior art as the amount of cold stored increases. Particularly, the system of the present invention is characteristic in that the performance thereof is not deteriorated in a high cold storage quantity region.

Thus, according to the present invention, the lowering of the freezing temperature caused by concentration of the aqueous solution which results from the formation of ice crystals, as well as the resulting decrease of the refrigerator efficiency, which have so far been considered unavoidable for the dynamic type ice cold storage system using an aqueous solution, can be avoided without the addition of any special device or the application of any new energy. Thus, through the realization of high performance and popularization of the ice cold storage system it is expected that there can be made contribution to the peak-cut of power demand in the summer season.

As set forth above, the following effects are obtained by the dynamic type ice cold storage method and system according to the present invention.

(1) According to the method of the present invention, as the aqueous solution in the freezer is frozen by the heat exchanger for cooling to produce an ice slurry containing ice crystals, water is replenished successively into the freezer, so that it is possible to prevent an increase in concentration of the aqueous solution in the freezer and keep the freezing temperature in the freezer almost constant, whereby a lowering in the coefficient of performance of the refrigerator is suppressed and there is attained a decrease of the power required for the formation of ice crystals.

(2) As the water to be replenished into the freezer at the time of ice cold storage, if there is used melted water of ice crystals in the freezer obtained at the time of a previous recovery of cold and which has been stored, the melted water can be utilized appropriately and repeatedly because it is substantially in the state of pure water containing little solute.

(3) In the dynamic type ice cold storage system of the present invention, at the time of ice cold storage, first an aqueous solution is fed from the aqueous solution tank into the freezer by means of the aqueous solution pump and an ice slurry containing ice crystals is formed within the freezer under both freezing action of the heat exchanger for cooling and agitating action of the agitator. In this case, for preventing a drop of the freezing temperature and in accordance with a measured value of liquid temperature in the freezer obtained by the thermometer the melted water stored at the time of a previous recovery of cold is replenished into the freezer from the melted water tank by means of the melted water pump, whereby the concentration of the aqueous solution can be maintained in a normal condition, thus permitting the formation of the ice slurry in an efficient manner. At the time of recovering cold, the freezer is used as a melter and the heat exchanger for cooling is used as a heat exchanger for the recovery of cold. In this case, the aqueous solution contained in the ice slurry is filtered beforehand through the mesh and is stored within the aqueous solution tank, while the remaining ice crystals are melted by the heat exchanger for the recovery of cold and the melted water is stored in the melted water tank, thus permitting repeated use of the aqueous solution and the melted water.

(4) In the dynamic type ice cold storage system, also where the freezer and the melter are provided separately from each other and are connected together through a pipe with pump, as in the previous case where the freezer also serves as the melter, at the time of storing ice cold, first an aqueous solution is fed into the freezer from the aqueous solution tank by means of the aqueous solution pump and an ice slurry containing ice crystals is formed within the freezer under both freezing action of the heat exchanger for cooling and agitating action of the agitator. In this case, for preventing a drop of the freezing temperature and in accordance with a measured value of liquid temperature in the freezer the melted water stored at the time of a previous recovery of cold can be replenished into the freezer from the melted water tank by means of the melted water pump, so that the formation of the ice slurry can be done efficiently. Then, at the time of recovering cold, the heat exchanger for the recovery of cold disposed within the melter is used, but in this case the aqueous solution contained in the ice slurry is filtered beforehand through the mesh and is stored in the aqueous solution tank, while the remaining ice crystals are melted by the heat exchanger for the recovery of cold and the melted water is stored in the melted water tank, thus permitting repeated use of the aqueous solution and the melted water. Besides, since the freezer and the melter are connected together through a pipe with pump, even if the place requiring cold and where the melter is installed is remote from the freezer, the feed of the ice slurry can be done through the pipe with pump if the outer periphery of the pipe is covered with a sufficient cold retaining layer.

(5) If for adjusting the concentration of the aqueous solution in the freezer the feed of water into the freezer by the melted water pump is performed automatically by the control system in accordance with a detection signal provided from the thermometer which detects the temperature of liquid in the freezer, the operation and management of the dynamic type ice cold storage system can be done efficiently and accurately.

What is claimed is:

1. A dynamic type ice cold storage method comprising: charging an aqueous solution into a freezer which includes a heat exchanger for cooling, allowing an ice slurry containing ice crystals to be formed within the freezer, and replenishing water into the freezer in a successive manner in response to a drop in liquid temperature in the freezer so as to keep the freezing temperature in the freezer almost constant.

2. A dynamic type ice cold storage method according to claim 1, wherein melted water obtained by melting the ice crystals in the freezer at the time of a previous recovery of cold is used as the water which is replenished in a successive manner into the freezer.

* * * * *